United States Patent
Raji et al.

(10) Patent No.: US 11,023,923 B2
(45) Date of Patent: Jun. 1, 2021

(54) DETECTING FRAUD IN CONNECTION WITH ADVERSTISEMENTS

(71) Applicant: Facebook, Inc., Menlo Park, CA (US)

(72) Inventors: Vijaye Ganesh Raji, Redmond, WA (US); Jason Duane Clark, Woodinville, WA (US); Eugene Zarakhovsky, Seattle, WA (US); Jonathan J. Gross, Seattle, WA (US); Brent Dorman, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 1296 days.

(21) Appl. No.: 14/285,289

(22) Filed: May 22, 2014

(65) Prior Publication Data

US 2015/0339705 A1  Nov. 26, 2015

(51) Int. Cl.
*G06Q 30/02* (2012.01)
*G06F 21/60* (2013.01)
*G06F 21/55* (2013.01)

(52) U.S. Cl.
CPC ....... *G06Q 30/0248* (2013.01); *G06F 21/552* (2013.01); *G06F 21/60* (2013.01); *G06Q 30/02* (2013.01)

(58) Field of Classification Search
CPC .............. G06C 30/0248; G06F 21/552; G06Q 30/0248
See application file for complete search history.

(56) References Cited

U.S. PATENT DOCUMENTS

| | | | | |
|---|---|---|---|---|
| 5,948,061 | A  * | 9/1999  | Merriman   | G06Q 30/02 705/14.53 |
| 7,266,693 | B1 * | 9/2007  | Potter     | H04L 9/3226 382/249 |
| 8,701,192 | B1 * | 4/2014  | Glick      | G06F 21/566 726/24 |
| 2003/0103034 | A1* | 6/2003  | Silverbrook | B41J 13/103 345/156 |
| 2004/0267806 | A1* | 12/2004 | Lester     | G06Q 30/02 |
| 2006/0136294 | A1* | 6/2006  | Linden     | G06Q 30/0257 705/14.47 |
| 2006/0265493 | A1* | 11/2006 | Brindley   | G06Q 30/02 709/224 |
| 2007/0073579 | A1* | 3/2007  | Immorlica  | G06Q 30/0267 705/14.47 |
| 2007/0179849 | A1* | 8/2007  | Jain       | G06Q 30/0273 705/14.41 |
| 2007/0239604 | A1* | 10/2007 | O'Connell  | G06Q 20/4016 705/50 |
| 2008/0112624 | A1* | 5/2008  | Jaffe      | G06K 9/52 382/224 |

(Continued)

*Primary Examiner* — David J Stoltenberg
*Assistant Examiner* — Robert C Johnson
(74) *Attorney, Agent, or Firm* — Fenwick & West LLP

(57) ABSTRACT

Embodiments are disclosed for identifying a suspect application based on multiple operating factors from use of multiple applications. The embodiments can generate a representative distribution of a selected factor based on collected information corresponding to multiple operating factors from use of multiple applications. The embodiments can compare a representative distribution of a target factor with the representative distribution of the selected factor and identify a suspect application when these distributions are different.

10 Claims, 7 Drawing Sheets

(56) References Cited

U.S. PATENT DOCUMENTS

| | | | |
|---|---|---|---|
| 2009/0198579 A1* | 8/2009 | Lewis | G06Q 30/0248 705/14.47 |
| 2010/0094767 A1* | 4/2010 | Miltonberger | G06Q 40/02 705/325 |
| 2011/0035276 A1* | 2/2011 | Ghosh | G06Q 30/02 705/14.46 |
| 2011/0047594 A1* | 2/2011 | Mahaffey | G06F 21/564 726/1 |
| 2011/0071908 A1* | 3/2011 | Ghosh | G06Q 30/08 705/14.71 |
| 2011/0137925 A1* | 6/2011 | Baird | G06Q 30/02 707/758 |
| 2012/0209773 A1* | 8/2012 | Ranganathan | G06Q 20/3224 705/44 |
| 2012/0240236 A1* | 9/2012 | Wyatt | G06F 21/10 726/25 |
| 2013/0104203 A1* | 4/2013 | Davis | H04L 63/0861 726/5 |
| 2014/0115701 A1* | 4/2014 | Moshchuk | G06F 21/54 726/23 |
| 2014/0270414 A1* | 9/2014 | Slaby | G06F 21/36 382/124 |
| 2014/0337221 A1* | 11/2014 | Hoyos | H04L 63/0861 705/44 |
| 2014/0344927 A1* | 11/2014 | Turgeman | G06F 21/554 726/22 |
| 2015/0172060 A1* | 6/2015 | Mahaffey | G06F 21/57 713/176 |

* cited by examiner

DETECTING FRAUD IN CONNECTION WITH ADVERSTISEMENTS

BACKGROUND

The use of mobile computing devices ("mobile devices") has become quite commonplace. Mobile devices currently in use include smartphones, computing tablets, laptop computers, personal digital assistants, and so forth. Users of mobile devices commonly use various software applications (hereinafter referred to as "app" or "apps") particularly designed for use with mobile devices. To defray app development costs, some app developers include advertisements in their app(s).

App platform service providers (e.g., social networks and others) can share advertisement ("ad") revenue with app developers who are willing to allow advertising materials to be displayed on their apps. There are several ways to calculate the advertising payments for these app developers. For example, payments can be calculated based on download numbers of specific apps, presentation/display time of advertising content (e.g., time periods that during which advertising is actually displayed or presented on users' mobile devices), or "click-throughs" when mobile device users interact with advertising (e.g., users actually click on the banner of certain advertising pieces).

Because app developers are generally paid more when they display more advertisements, they are incentivized to make their apps as popular as possible so that many ads can be served. However, malicious app developers may even attempt to use unscrupulous techniques to inflate various metrics used to determine how much app developers are to be paid. For example, a developer can create an "automatic" or "robot" program to increase the number of downloads, presentation time, or click-throughs. These malicious or even fraudulent techniques can cause app platform service providers to pay more to app developers then was agreed upon.

BRIEF DESCRIPTION OF THE DRAWINGS

Objects, features and characteristics of the disclosed technology will become more apparent to those skilled in the art from a study of the following Detailed Description in conjunction with the appended claims and drawings, all of which form a part of this specification.

DETAILED DESCRIPTION

Embodiments are disclosed for detecting automated interaction with advertisements intended to be displayed in apps on mobile devices. App platform service providers (or other entities, e.g., network service providers) can collect user behavior information across many devices, apps, and users. User behavior information for a specific "target" app of a specific mobile device app can also be collected from various sources (e.g., from networks, servers, communication carriers, or end user devices). The collected user behavior information can be analyzed in the aggregate, and a representative user behavior pattern for the target app can be compared to the aggregate user behavior. The target app can be identified as a suspect app if its representative user behavior pattern is different from the aggregate user behavior pattern. The identified suspect app can be further analyzed or verified by various tests.

In some embodiments, the aggregate user behavior information can be collected from various mobile devices. In other embodiments, this information can be collected from a trusted source. The collected aggregate user behavior information can be analyzed (e.g., in a statistical way) and the result of analysis can be presented as statistical distributions for various operating factors. The operating factors can include at least two types of factors: operating-condition and user-interaction factors. The operating-condition factors relate to operating environments of mobile devices when multiple apps are operated. The user-interaction factors relate to user responses to multiple apps (e.g., a user clicks through an advertisement presented by an app, e.g., by touching a screen). Some operating factors can be correlated with other operating factors, and these correlations can be used to further analyze or verify identified suspect apps. The multiple apps discussed above can include any types of apps that can display or present visual (e.g., graphical or textual) or audio advertisements to users. For example, the advertisements can be visual objects (e.g., text or photographs), audible messages, or audio-visual objects.

Figure 1:
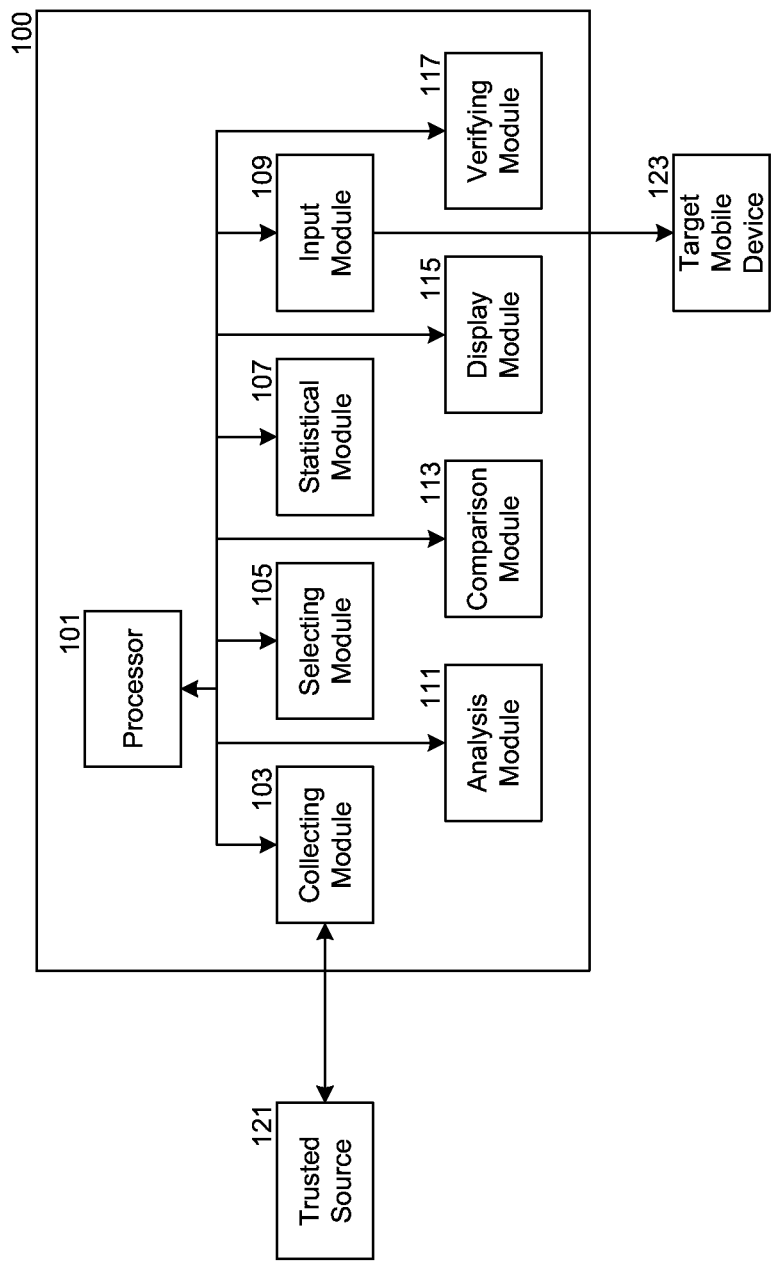
FIG. 1 is a block diagram illustrating a computing device for identifying a suspect application in accordance with various embodiments.

Several embodiments are discussed below in more detail in reference to the Figures. Turning now to the Figures, FIG. 1 is a block diagram illustrating a computing device 100 for identifying a suspect application in accordance with various embodiments. In the illustrated embodiment, the computing device 100 can include a processor 101, a collecting module 103, a selecting module 105, a statistical module 107, an input module 109, an analysis module 111, a comparison module 113, a display module 115, and a verification module 117. In some embodiments, the computing device 100 can further include an audio module (e.g., a microphone and/or a speaker) (not shown) for communicating with administrators. In other embodiments, the computing device 100 can include other suitable components or modules to perform similar functions. Examples of the computing device 100 can include a desktop computer, a notebook, a netbook, a personal digital assistant (PDA), a workstation, a server, a mainframe, a supercomputer, or a wearable computer (e.g., as a glasses). The processing unit 101 can be electrically coupled to and controls the modules 103, 105, 107, 109, 111, 113, 115, and 117 mentioned above.

The processor 101 can be a single processing unit or multiple processing units in one device or distributed across multiple devices. The processor 101 can be coupled to other hardware devices, for example, with the use of a BUS, such as a PCI BUS or SCSI BUS. The processor 101 can communicate with a hardware controller for devices such as the display module 115. The display module 115 can be used to display text and graphics. One example of the display module 115 is a display of the touchscreen that provides graphical and textual visual feedback to a user. The processor 101 can have access to a memory (not shown). A memory can include one or more of various hardware devices for volatile and non-volatile storage, and can include both read-only and writable memory. For example, a memory can include random access memory (RAM), read-only memory (ROM), non-volatile memory, such as flash memory, hard drives, floppy disks, CDs, DVDs, magnetic storage devices, tape drives, device buffers, and so forth. A memory is not a propagating electrical signal separated from underlying hardware, and is thus non-transitory.

The collecting module 103 is configured to receive, from a trusted source 121 (discussed in detail below), a first set of information corresponding to multiple operating factors regarding use of multiple apps or applications. In other embodiments, the first set of information can be received from other sources (discussed below). As mentioned above, the operating factors can include at least two types of factors: operating-condition factors and user-interaction factors. Examples of the operating-condition factors can include a remaining battery life, a brightness setting of a display, a remaining memory, a remaining computation resource (e.g., remaining processor capacity or processor utilization), a remaining disk space, an operating altitude (e.g., users may use certain apps in mountain areas more frequently), an operating location (e.g., air flight schedule apps can be used more frequently in airports than other locations), an operating tilt value (e.g., users may hold a mobile device at an angle relative to the horizontal), an operating temperature (e.g., can be measured by temperature sensors), and/or an operating humidity (e.g., can be measured by humidity sensors). Examples of the user-interaction factors can include a fingerprint pattern (e.g., fingerprint sizes, shapes, or relative positions on screens), a finger movement pattern (e.g., trajectories illustrating how users move their fingers on screen), or a touch pattern (e.g., user's response to a presented advertisement by touching a screen). In some embodiments, the first set of information can include 10,000,000 data entries of remaining battery lives (e.g., ranging from 0% to 100%) when users utilize 10,000 different apps (e.g., 1,000 data entries from each app). In other embodiments, the first set of information can include 50,000 data entries of fingerprint patterns collected when users utilize 5,000 different apps (e.g., 10 data entries from each app in average). Numbers of data entries can vary depending on various factors, e.g., difficulty of data collection or confidence of data validity.

In the illustrated embodiment, the trusted sources 121, for example, can include a source of: (1) apps developed by pre-certified app developers (e.g., trusted app developers); (2) most popular apps that are most-frequently downloaded by users; or (3) apps otherwise verified/authenticated by an administrator or by other suitable means. In other embodiments, the first information can be collected at various mobile devices (e.g., may not be a trusted source) directly by the computing device 100. For example, the first information can be collected from log files at suitable mobile devices or servers. In some embodiments, the first information can be collected through operating systems or application programming interfaces (APIs) at suitable mobile devices or servers.

In the illustrated embodiment, the selecting module 105 can be configured to interface with an administrator of the computing device 101, e.g., to allow him/her to select at least one factor from the multiple operating factors (the "selected factor"). The selected factor can be determined based on types of apps to be analyzed or verified, advertisement types, personal preferences, or other suitable criteria. For example, for some location-based apps (e.g., apps for a national park or other specific areas), the selected factor can be the operating location. In another example, for video-game apps, the selected factor can be the tilt value (e.g., a user tends to hold his/her mobile device in certain positions so as to operate these apps properly).

After determining the selected factor, the statistical module 107 can then generate a second set of information based on the first set of information and the selected factor. The second set of information can include a representative distribution of the selected factor. The representative distribution of the selected factor can be generated based on a statistical analysis. For example, the second set of information can include a representative distribution of 500,000 data entries of display brightness settings (the selected factor) when 5,000 different apps are operated (e.g., 100 data entries for each app in average). Examples of the representative distribution of the selected factor can be found at FIGS. 2A-2H and corresponding descriptions, as discussed in detail below.

In the illustrated embodiment, the input module 109 can receive a third set of information of a target mobile device application from a target mobile device 123. In other embodiments, the input module 109 can receive the third set of information of the target mobile device application from other sources (e.g., through an information collection agent or the trusted source 121). The third set of information can include a target factor of the target mobile device application. In some embodiments, the target factor is the same as the selected factor, at least for the purpose of having a statistically meaningful comparison between these two factors. For example, assuming that the selected factor is "remaining memory" when multiple apps are operated, then the target factor can be "remaining memory" when the target mobile device application is operated. In some embodiments, however, the target factor can only correspond to the selected factor (not necessarily the same). For example, assuming that two operating factors "remaining memory" and "remaining disk space" somewhat correspond (or correlate) to each other, when the selected factor is "remaining memory" when multiple apps are operated, the target factor can be "remaining disk space" when the target mobile application is operated. This flexibility is especially advantageous when there are only limited types of target factors available for analysis. In some embodiments, the selected factors can be more than one. For example, the selected factors can be both "remaining memory" and "remaining disk space" when multiple apps are operated, and accordingly the target factor can be "remaining memory" and "remaining disk space" when the target mobile device application is operated.

In the illustrated embodiments, the analysis module 111 can generate a fourth set of information based on the third set of information and the target factor. The fourth set of information can include a representative distribution of the target factor. The representative distribution of the target factor can be generated based on a statistical analysis (e.g., similar to, or the same as, the statistical analysis used for generating the representative distribution of the selected factor). One example of the representative distribution of the target factor can be found in FIG. 3 and corresponding descriptions, as discussed below.

The comparison module 113 can then compare the fourth set of information with the second set of information. More particularly, a representative distribution of the selected factor and a representative distribution of the target factor are compared. One example of the comparison can be found in FIG. 3 and corresponding descriptions, as discussed below.

In the illustrated embodiment, the target application can be identified as a suspect application if the fourth set of information is different from the second set of information. In some embodiments, the criteria of determining suspect applications can be adjusted (e.g., "statistically") based on various factors, e.g., types of selected factors and target factors, types of apps to be analyzed, and/or types of target mobile applications. Examples of the criteria can be "different," "substantially different," and/or "statistically different." An administrator can define the criteria depending on various reasons. In some embodiments, an administrator can define a tolerance range that can be used to define his/her "different" (e.g., it is not "different" if a presented difference is within the tolerance range). In the illustrated embodiment, the comparison result (e.g., a target mobile device application is identified as a suspect application) can be visually presented to an administrator via the display module 115 (or audibly present to an administrator via a suitable audio module). In other embodiments, the comparison result can be presented in various suitable ways, e.g., by sending summary reports, alerts, signals, and/or electronic messages to an administrator.

In the embodiment illustrated in FIG. 1, the computing device 100 can further verify the comparison result by employing the verifying module 117. The verifying module 117 can analyze an identified suspect application at least based on correlations among the multiple operating factors; click-through rates of blank advertisements; and/or a fractal pattern test. As discussed above, operating factors may correlate to one another and this correlation can be used to further verify whether an administrator should increase the suspiciousness level of an identified suspect application. In some embodiments, for example, "brightness settings of displays" can correlate to "remaining battery lives." This can be caused by facts that several users tend to adjust their "brightness settings of displays" (e.g., to a darker setting) when their "remaining battery lives" are relatively low. An administrator can increase the suspiciousness level of an identified suspect application if its representative distributions of the target factor do not have a same (or substantially similar, e.g., within some percentage of a standard deviation) correlation as corresponding representative distributions of the selected factor.

Alternatively or additionally, the verifying module 117 can analyze an identified suspect application based on click-through rates of blank advertisements. The click-through rate of an advertisement can be defined as a number of click-throughs during a pre-determined period of time when the advertisement is presented (e.g., 10,000 click-throughs during 24 hours). In other embodiments, the click-through rate can be defined in other suitable ways. An administrator can place a blank advertisement (e.g., without any visual content) to see whether an identified suspect application would have a same (or close) click-through number as a regular advertisement. If so, the administrator can then increase the suspiciousness level of the identified suspect application.

Alternatively or additionally, the verifying module 117 can analyze an identified suspect application based on a fractal pattern test. An administrator can adjust or change the shape or relative location of an advertisement, to further verify whether an identified suspect application would have a same (or similar) response as a regular (e.g., unchanged) advertisement. The fractal pattern test will be discussed in detail below with reference to FIG. 4 below.

Figure 2A:
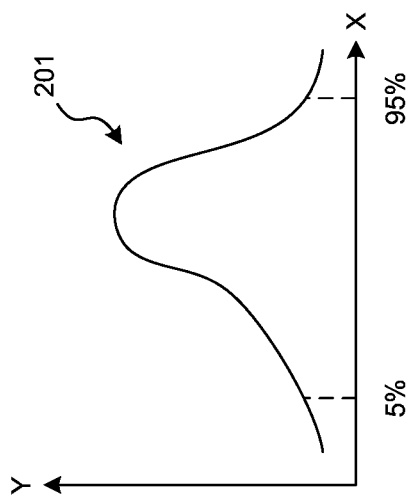
FIGS. 2A-2D are schematic diagrams illustrating representative distributions of an operating factor (e.g., remaining battery lives) in accordance with various embodiments.

FIGS. 2A-2D are schematic diagrams illustrating representative distributions of an operating factor (e.g., remaining battery life) in accordance with various embodiments. As shown in FIG. 2A, the representative distribution 201 of the operating factor can be a bell curve. Axis X represents the value of the operating factor (e.g., remaining battery life in percentage). Axis Y represents the number of data entries or records (e.g., the number of apps or the number of app usage). In the embodiments shown in FIGS. 2B and 2C, the representative distribution 201 of the operating factor can be skewed distributions. In the embodiment shown in FIG. 2D, the representative distribution 201 of the operating factor can be a curve with two peaks. In other embodiments, the representative distribution 201 of the operating factor can have a curve with more than two peaks. In other embodiments, the representative distribution 201 can be other suitable distributions.

Figure 2C:
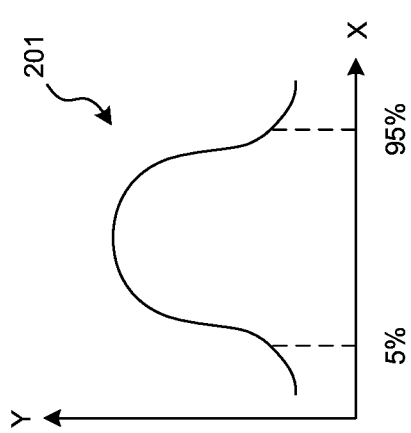
Figure 2B:
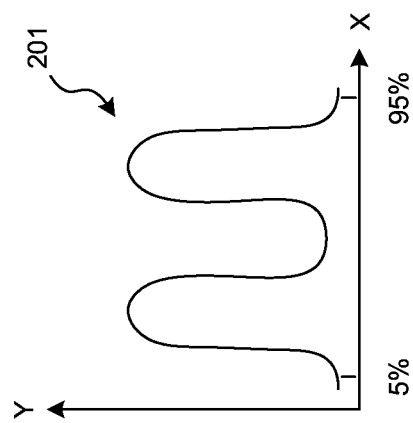
Figure 2D:
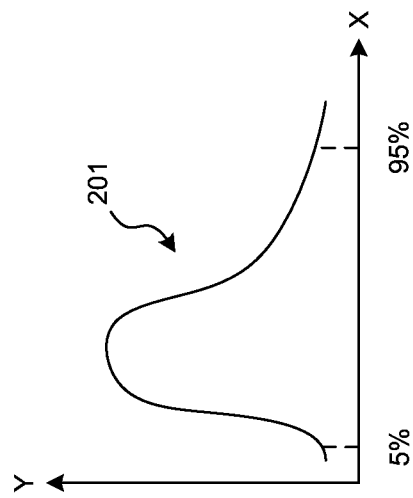
Figure 2E:
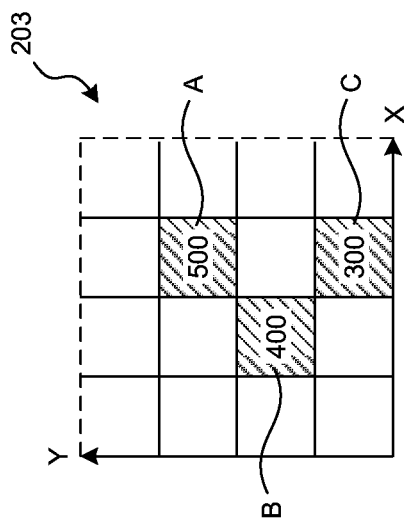
FIGS. 2E and 2F are schematic diagrams illustrating representative distributions of an operating factor (e.g., user's touch pattern in response to multiple apps) in accordance with various embodiments.
Figure 2F:
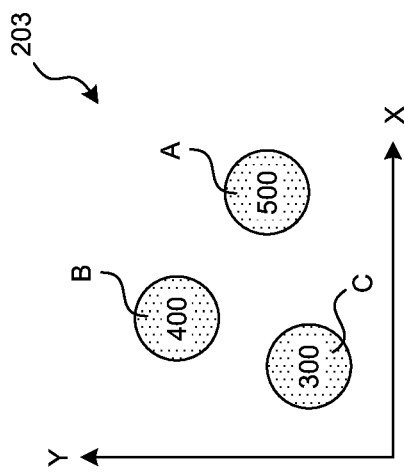

FIGS. 2E and 2F are schematic diagrams illustrating representative distributions of an operating factor (e.g., user's touch pattern in response to multiple apps) in accordance with various embodiments. As shown in FIGS. 2E and 2F, the representative distributions 203 of the operating factor can be presented as dot maps or bitmaps. Axis X and Axis Y can represent a relative location on a display or screen of a mobile device. Dots or numbers shown in Areas A, B, and C represent the numbers of user's interactions with multiple apps by touching the display or screen. In the illustrated embodiments in FIGS. 2E and 2F, during a specific time and among multiple apps, there are 500 interactions or touches that happened in Area A, 400 interactions or touches happened in Area B, and 300 interactions or touches happened in Area C. In other embodiments, the numbers of interactions or touches can be presented by different formats, such as by contour lines, heap maps, or color scales. Numbers of interactions described above are only examples and can vary (e.g., into the millions) depending on numbers of data entries or other suitable factors.

Figure 2G:
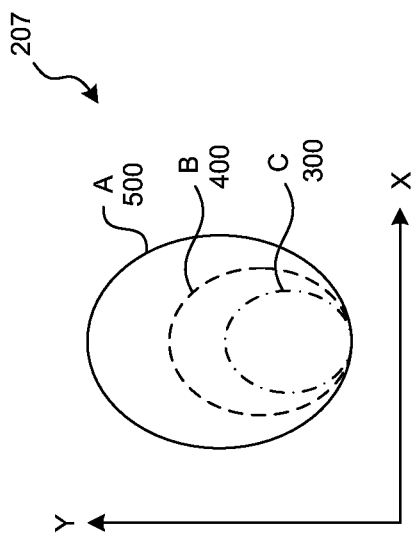
FIG. 2G is schematic diagram illustrating a representative distribution of an operating factor (e.g., user's finger movement pattern in response to multiple apps) in accordance with various embodiments.

FIG. 2G is schematic diagram illustrating a representative distribution of an operating factor (e.g., user's finger movement pattern) in accordance with various embodiments. As shown in FIG. 2G, the representative distribution 205 of the operating factor can be presented as trajectories. In FIG. 2G, Axis X and Axis Y can represent a relative location of a display or screen of a mobile device. In the illustrated embodiment in FIG. 2G, during a specific time and among multiple apps, there are 500 user's finger movements going through trajectory A-B-C-D; there are 400 user's finger movements going through trajectory A-C-D; there are 300 user's finger movements going through trajectory A-E; and there are 900 (e.g., 400+500) user's finger movements going through trajectory C-D. In other embodiments, the numbers of reference points (e.g., points A, B, C, D, and E in FIG. 2G) can vary and the trajectories can include various curves. Numbers of finger movements described above are only examples and can vary depending on numbers of data entries or other suitable factors.

Figure 2H:
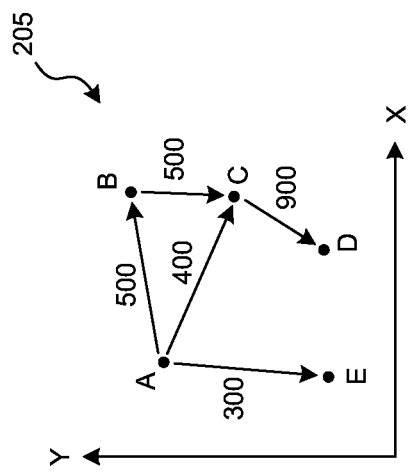
FIG. 2H is schematic diagram illustrating a representative distribution of an operating factor (e.g., user's fingerprint pattern in response to multiple apps) in accordance with various embodiments.

FIG. 2H is schematic diagram illustrating a representative distribution of an operating factor (e.g., user's fingerprint pattern in response to multiple apps) in accordance with various embodiments. As shown in FIG. 2H, the representative distribution 207 of the operating factor can be presented as shapes of thumbs. In other embodiments, the representative distribution 207 can be presented as shapes of other fingers or palms (or even footprints). In FIG. 2H, Axis X and Axis Y can represent horizontal and vertical scales, so as to show sizes of user's fingerprints in FIG. 2H. Fingerprint patterns represented by Area A have larger sizes than those represented by Area B or Area C. Fingerprint patterns in Areas A, B, and C also reflect different shapes of users' thumbs or other fingers. In the distribution shown in FIG. 2H, there are 500 user's fingerprints in shape/size A; there are 400 user's fingerprints in shape/size B; and there are 300 user's fingerprints in shape/size C. Numbers of patterns described above are only examples and can vary depending on numbers of data entries or other suitable factors.

Figure 3:
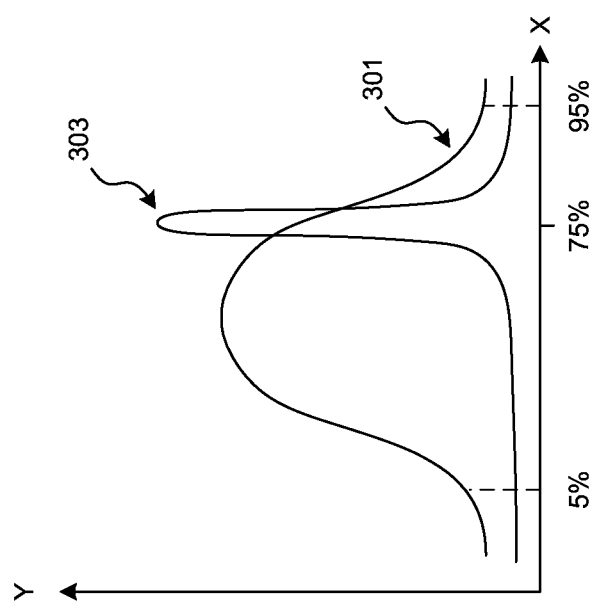
FIG. 3 is a schematic diagram illustrating a comparison between a representative distribution of a selected operating factor and a representative distribution of a target factor in accordance with various embodiments.

FIG. 3 is a schematic diagram illustrating a comparison between a representative distribution of a selected operating factor (e.g., remaining battery life from use of multiple apps) and a representative distribution of a target factor (e.g., remaining battery life from use of a target mobile application) in accordance with various embodiments. Axis X represents the value of the operating factor (e.g., remaining battery lives in percentage). Axis Y represents the number of records to be analyzed (e.g., the number of app usage). As shown in FIG. 3, the selected representative distribution 301 can be a normal distribution or a bell curve. The target representative distribution 303 can be a curve with a significant peak (located at around 75% remaining battery life). Based on the comparison result, an administrator can identify the target mobile device as a suspect application because the selected representative distribution 301 and the target representative distribution 303 are different. In other words, it can be suspicious that most of the app usage of the target mobile device happens when the remaining battery life equals to around 75%.

Figure 4:
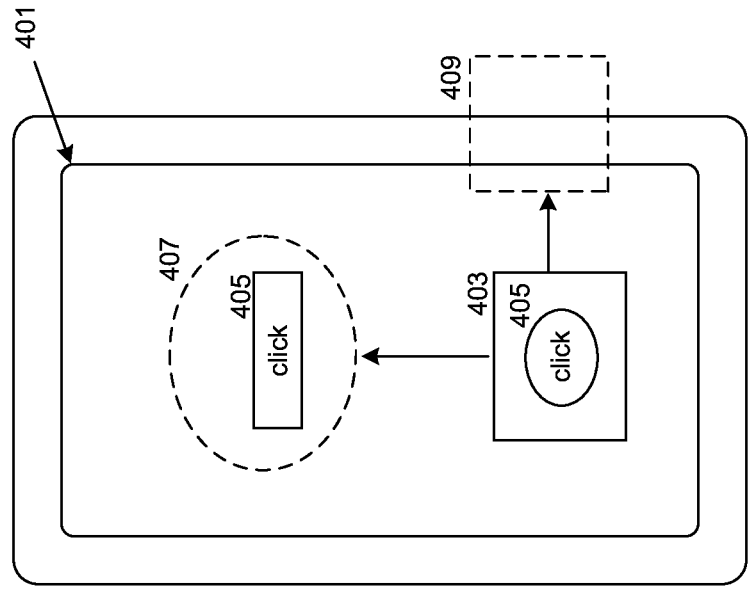
FIG. 4 is a schematic diagram illustrating a fractal pattern test in accordance with various embodiments.

FIG. 4 is a schematic diagram illustrating a fractal pattern test in accordance with various embodiments. The fractal pattern test can be a test that utilizes a change (e.g., a location change or a shape change) of an object (e.g., a picture shown in a display of a mobile device) to verify whether a set of user interactions with that object is performed by a human user (e.g., not by automation or software). In some embodiments, the shape change of the object can be "fractal" (e.g., the object can be changed into a similar shape with a different size). In the embodiment illustrated in FIG. 4, the fractal pattern test can be performed by a computing device 400 that includes a display area 401. The display area 401 can further include a designated area 403 configured to present a predetermined object 405, e.g., an advertisement, a visual control button, or other objects/components that users can interact with. The fractal pattern test can be performed by the following steps to verify whether a user interaction with the predetermined object 405 is fraudulent. Assuming that a target mobile device application has been identified as a suspect application, an administrator can move the predetermined object 405 from the designated area 403 (where users interact with the identified suspect application) to a testing area 407. In the illustrated embodiment, the shape of the testing area 407 can be different from the designated area 403. The shape of the predetermined object 405 can also be changed (e.g., from an eclipse to a rectangle shown in FIG. 4). After these changes, the administrator can then keep collecting information regarding user interactions of the identified suspect application. It can be suspicious if the user interactions do not change in accordance with the location change and/or the shape change of the designated area 403 (and/or the shape change of the predetermined object 405). The administrator can increase the suspiciousness level of the identified suspect application.

In some embodiments, the administrator can move the predetermined object 405 from the designated area 403 to an outer area 409. This movement is intended to make difficult for users to see the predetermined object 405 and therefore hard to interact with it. After these changes, the administrator can then keep collecting information regarding user interactions of the identified suspect application. It can be suspicious if the user interactions do not change in accordance with the location change of the designated area 403. The administrator can then increase the suspiciousness level of the identified suspect.

Figure 5:
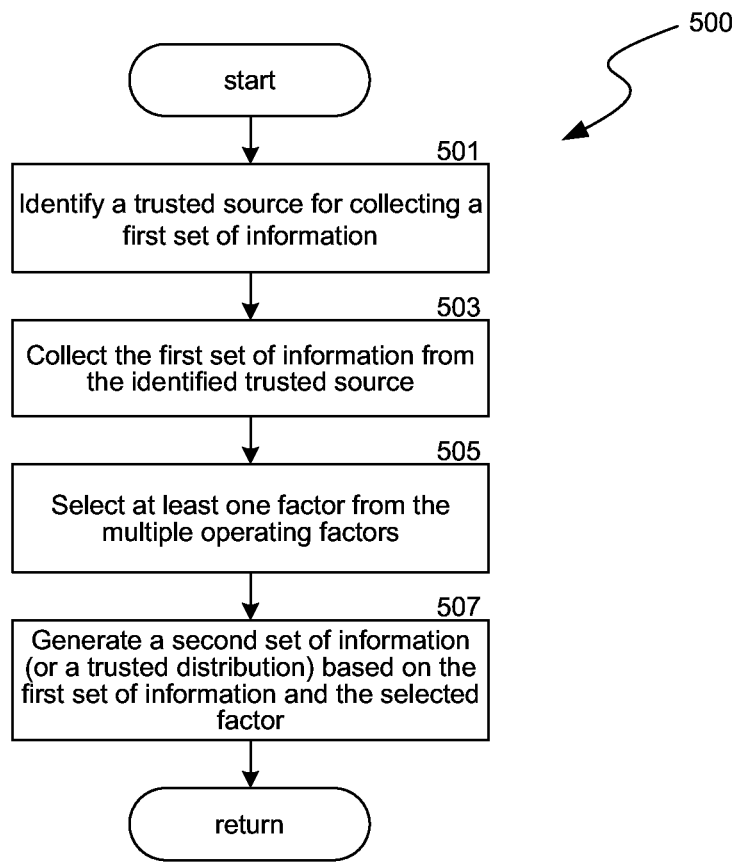
FIG. 5 is a flowchart illustrating a method for generating one or more trusted distributions in accordance with various embodiments.

FIG. 5 is a flowchart illustrating a method 500 for generating one or more trusted distributions in accordance with various embodiments. The method 500 can be performed or implemented by various devices, e.g., the computing device 100. The method 500 can start at block 501 by identifying a trusted source for collecting a first set of information. In some embodiments, the trusted source can be multiple mobile devices in the aggregate. In other words, a sufficiently-large number of mobile devices can be considered as a trust worthy source of information (e.g., assuming that most of the mobile devices do not involve suspicious or fraudulent conducts). In other embodiments, the trusted source can be a verified data source that collects aggregate data from various mobile devices.

The first set of information corresponds to multiple operating factors from use of two or more applications. The first set of information can be computer-readable. Operating factors can include at least two types of factors: operating-condition factors and user-interaction factors. The operating-condition factors can include a remaining battery life, a brightness setting of a display, a remaining memory, a remaining calculation resource, a remaining disk space, an operating altitude, an operating tilt value, an operating temperature, an operating humidity, etc. The user-interaction factors can include a fingerprint pattern (e.g., fingerprint's sizes, shapes, or relative positions on screens), a finger movement pattern (e.g., trajectories illustrating how users move their fingers on screen), a touch pattern (e.g., user's response to a presented advertisement by touching a screen), etc.

The method 500 can continue at block 503 by collecting the first set of information from the identified trusted source. The first set of information can be collected via any suitable networks, communication protocols, or storage media. In some embodiments, the first set of information can be the aggregate user behavior information collected from various mobile devices. In other embodiments, this first set of information can be collected from one or more trusted data sources. At block 505, the method 500 can then proceed by selecting at least one factor from the multiple operating factors. This enables an administrator to choose at least one selected factor that further analysis can focus on. The selected factor can be determined based on types of apps to be analyzed, advertisement types, etc.

At block 507, the method 500 can continue by generating a second set of information (or a trusted distribution) based on the first set of information and the selected factor. The second set of information can include a representative distribution of the selected factor. Examples of representative distributions of the selected factor can be found in FIGS. 2A-2H. More particularly, in some embodiments, the representative distribution of the selected factor can include a normal distribution (e.g., a bell curve) as illustrated in FIG. 2A. In other embodiments, the representative distribution of the selected factor can include a skewed distribution, as illustrated in FIGS. 2B and 2C. In some embodiments, the representative distribution of the selected factor can include a curve with multiple peaks, as illustrated in FIG. 2D. In some embodiments, the representative distribution of the selected factor can be presented as a dot map or bitmap (e.g., FIG. 2E or 2F), trajectories (e.g., FIG. 2G), or fingerprint patterns (e.g., FIG. 2H). In some embodiments, the method 500 can further include maintaining a trusted distribution pool which includes multiple trusted distributions. The trusted distribution pool can provide a quick access of known trusted distributions.

Figure 6:
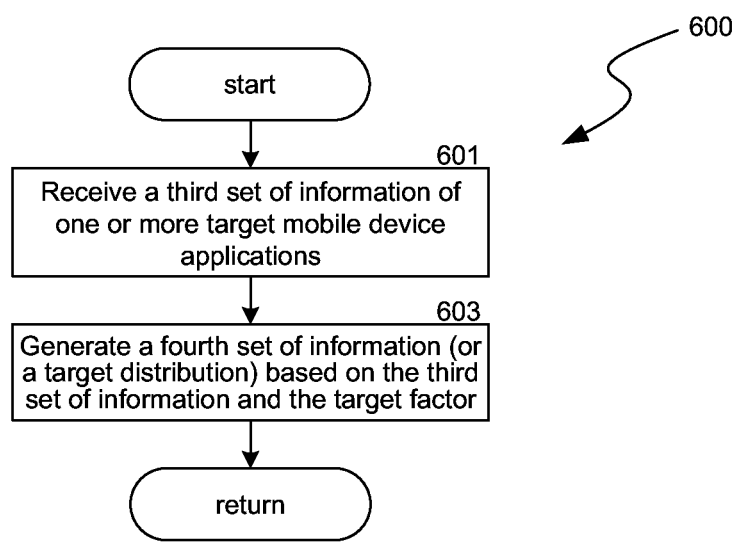
FIG. 6 is a flowchart illustrating a method for generating one or more target distributions in accordance with various embodiments.

FIG. 6 is a flowchart illustrating a method 600 for generating one or more target distributions in accordance with various embodiments. The method 600 can be performed or implemented by various devices, e.g., the computing device 100. At block 601, the method 600 can start by receiving a third set of information of one or more target mobile device applications. The third set of information corresponds to one or more target (operating) factors from use of the target mobile device application. In some embodiments, the target factor can be the same as the selected factor. In some embodiments, the target factor can correspond to a selected factor (e.g., the selected factor discussed in method 500 above). For example, the selected factor can be a remaining battery life represented by a percentage (e.g., 0% to 100%), and the target factor can be a remaining battery life represented by electricity unit (e.g., watt-hours).

At block 603, the method 600 can proceed by generating a fourth set of information (or a target distribution) based on the third set of information and the target factor. The fourth set of information can include a representative distribution of the target factor. An example of the representative distribution of the target factor can be found in FIG. 3 (e.g., the target representative distribution 303).

Figure 7:
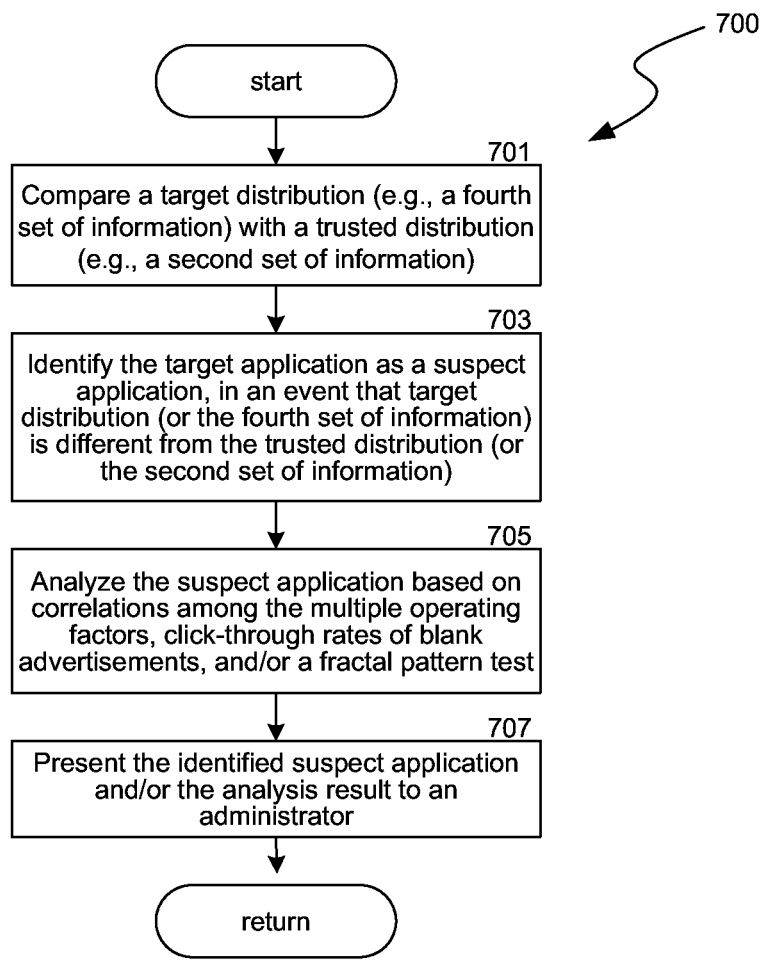
FIG. 7 is a flowchart illustrating a method for identifying and handling one or more suspect applications based on one or more trusted distributions and one or more target distributions in accordance with various embodiments.

FIG. 7 is a flowchart illustrating a method 700 for identifying and handling one or more suspect application based on one or more trusted distributions and one or more target distributions in accordance with various embodiments. The method 700 can be performed or implemented by devices such as the computing device 100. At block 701, the method 700 can start by comparing a target distribution (e.g., a fourth set of information) with a trusted distribution (e.g., a second set of information). An example of the comparison can be found in FIG. 3 (e.g., a comparison between a target distribution of "remaining battery life" and a trusted distribution of "remaining battery life"). In some embodiments, a target distribution (e.g., a target distribution of "remaining battery life") can be compared with a corresponding trusted distribution (e.g., a trusted distribution of "display brightness").

Alternatively, in some embodiments, the method 700 can compare two or more target distributions with one or more corresponding or correlated trusted distributions. In some embodiments, two or more target distributions can be compared with corresponding trusted distributions individually. For example, the target distribution of "remaining battery life" can be compared with the trusted distribution of "remaining battery life," and the target distribution of "display brightness" can be compared with the trusted distribution of "display brightness." In some embodiments, two or more target distributions can be compared with correlated trusted distributions. For example, the target distribution of "remaining battery life" can be compared with the trusted distribution of "display brightness," and the target distribution of "display brightness" can be compared with the trusted distribution of "remaining battery life." Comparison results can then be combined (e.g., by weightings assigned to each target distributions) to generate a score of fraud (or likelihood of fraud) to assist an administrator in further identifying suspicious applications.

At block 703, the method 700 can then continue by identifying the target application as a suspect application, in an event that target distribution (or the fourth set of information) is different from the trusted distribution (or the second set of information). In some embodiments, the criteria for determining suspect applications can be adjusted based on various factors, e.g., types of selected factors and target factors, types of apps to be analyzed, and/or types of target mobile applications. In some embodiments, the event that the fourth set of information is different from the second set of information can include an event that the representative distribution of the target factor departs from the representative distribution of the selected factor in a statistically significant way (e.g., there is a predetermined acceptable tolerance).

At block 705, the method 700 can continue by further analyzing (or verifying) the suspect application based on correlations among the multiple operating factors, click-through rates of blank advertisements, and/or a fractal pattern test. This analysis can be performed by a verifying device such as the verifying module 117 discussed above. An administrator can increase a suspiciousness level of an identified suspect application cannot pass this further analysis (or tests). Operating factors may correlate to one another and this correlation can be used to further verify whether an identified suspect application may involve certain fraudulent conducts (e.g., brightness settings of displays may correlate to remaining battery lives). The click-through rate of an advertisement can also be used to verify a suspect application by placing a blank advertisement (e.g., without any content) to see whether the click-through number is the same (or close) as regular advertisements. Discussion regarding the fractal pattern test can be found in FIG. 4 and corresponding descriptions above. At block 707, the method 700 can continue by presenting (e.g., by the display module 115 shown in FIG. 1) the identified suspect application and/or the analysis result to an administrator for further actions.

In some embodiments, the method 700 can further include providing feedback to a trusted distribution pool (e.g., discussed in the method 500 above). The method 700 can categorize a target distribution as a trusted distribution (e.g., adding it to the trusted distribution pool) after verification (e.g., by the verifying module 117, for specific times, or for a period of time). Similarly, in some embodiments, the method 700 can include removing an existing trusted distribution from the trusted distribution pool for various reasons (e.g., the existing trusted distribution deviates from other trusted distributions). The trusted distribution pool can be used as a trusted source for trusted distributions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of various embodiments is not intended to be exhaustive. While specific examples are described above for illustrative purposes, various equivalent modifications are possible, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further, any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the described embodiments.

We claim:

1. A method, performed by a computing device having a processor, comprising:
    collecting first data related to a selected operating factor associated with use of two or more trusted applications on a first plurality of computing devices, the selected operating factor comprising a fingerprint pattern, a finger movement pattern, or a touch pattern;
    generating a first representative distribution of the first data related to the selected operating factor;
    receiving second data related to the selected operating factor associated with use of a target mobile device application on a second plurality of computing devices;
    generating a second representative distribution of the second data related to the selected operating factor;
    comparing the first representative distribution with the second representative distribution;
    in an event that the first representative distribution does not meet a similarity criterion with the second representative distribution, identifying the target application as a suspect application; and
    analyzing the suspect application to determine if the suspect application is malicious responsive to the first representative distribution not meeting the similarity criterion.

2. The method of claim 1, wherein the multiple operating factors additionally include one or more of a remaining battery life, a brightness setting of a display, a remaining memory, a remaining calculation resource, a remaining disk space, an operating altitude, an operating location, an operating tilt value, an operating temperature, or an operating humidity.

3. The method of claim 1, wherein the fingerprint pattern includes a size, a shape, or a relative position on a screen.

4. The method of claim 1, wherein the representative distribution includes a normal distribution.

5. The method of claim 1, wherein the representative distribution includes a bitmap.

6. The method of claim 1, wherein the first set of information is collected from a trusted source.

7. The method of claim 1, wherein analyzing the suspect application comprises detecting a correlation among the multiple operating factors.

8. A non-transitory computer-readable storage device storing instructions that when executed by a processor cause the processor to perform steps comprising:
    collecting first data related to a selected operating factor associated with use of two or more trusted applications on a first plurality of computing devices, the selected operating factor comprising a fingerprint pattern, a finger movement pattern, or a touch pattern;
    generating a first representative distribution of the first data related to the selected operating factor;
    receiving second data related to the selected operating factor associated with use of a target mobile device application on a second plurality of computing devices;
    generating a second representative distribution of the second data related to the selected operating factor;
    comparing the first representative distribution with the second representative distribution;
    in an event that the first representative distribution does not meet a similarity criterion with the second representative distribution, identifying the target application as a suspect application; and
    analyzing the suspect application to determine if the suspect application is malicious responsive to the first representative distribution not meeting the similarity criterion.

9. The non-transitory computer-readable storage device of claim 8, wherein the multiple operating factors additionally include one or more of a remaining battery life, a brightness setting of a display, a remaining memory, a remaining calculation resource, a remaining disk space, an operating altitude, an operating location, an operating tilt value, an operating temperature, or an operating humidity.

10. The non-transitory computer-readable storage device of claim 8, wherein the fingerprint pattern includes a size, a shape, or a relative position on a screen.

* * * * *